Figure 1:
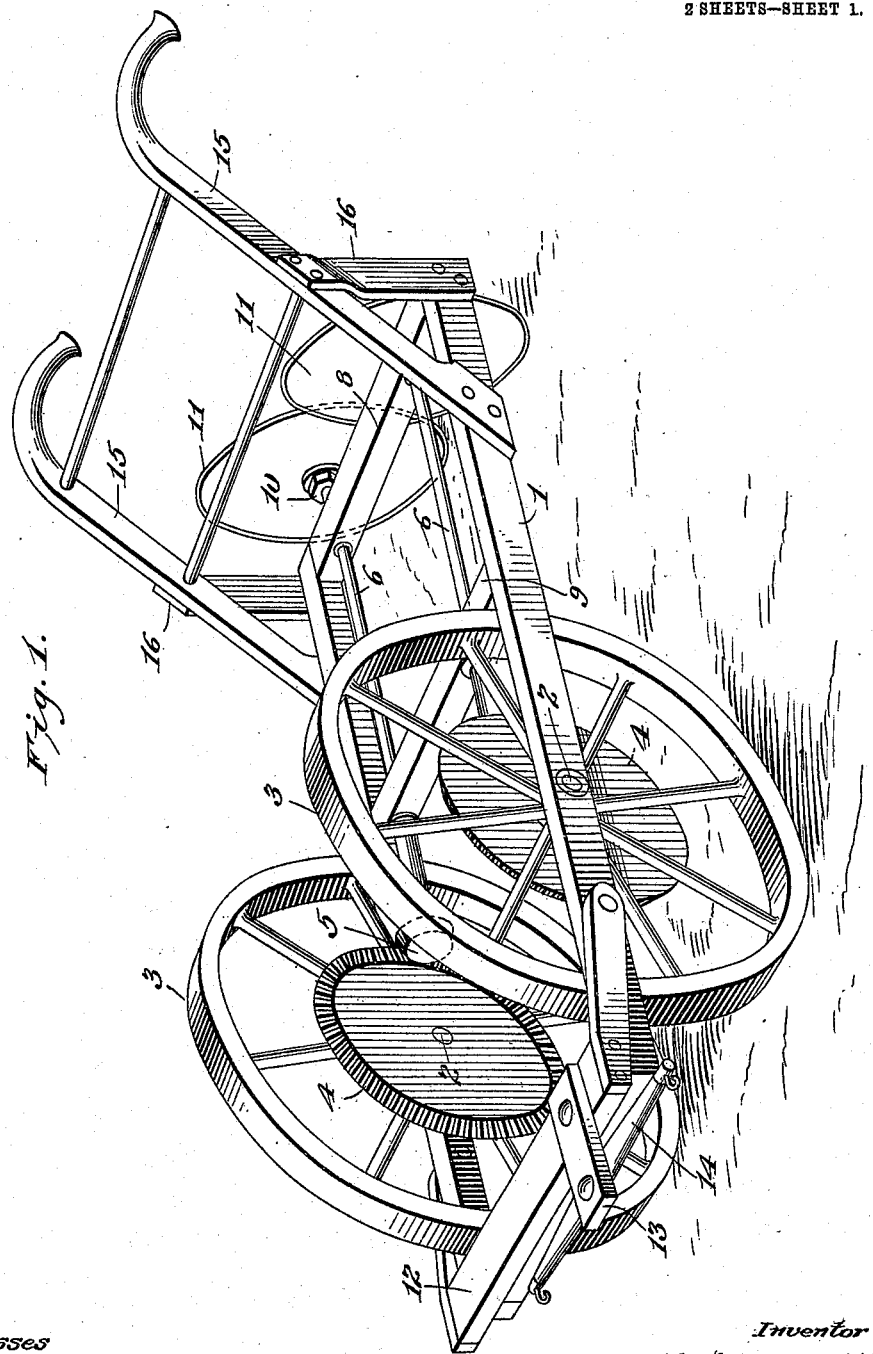

T. J. SMITH.
COTTON CHOPPER.
APPLICATION FILED DEC. 26, 1908.

924,287.

Patented June 8, 1909.
2 SHEETS—SHEET 1.

Witnesses
M. C. Lyddane
R. H. Krenkel

Inventor
Taylor J. Smith
By Joshua R. H. Potts
Attorney

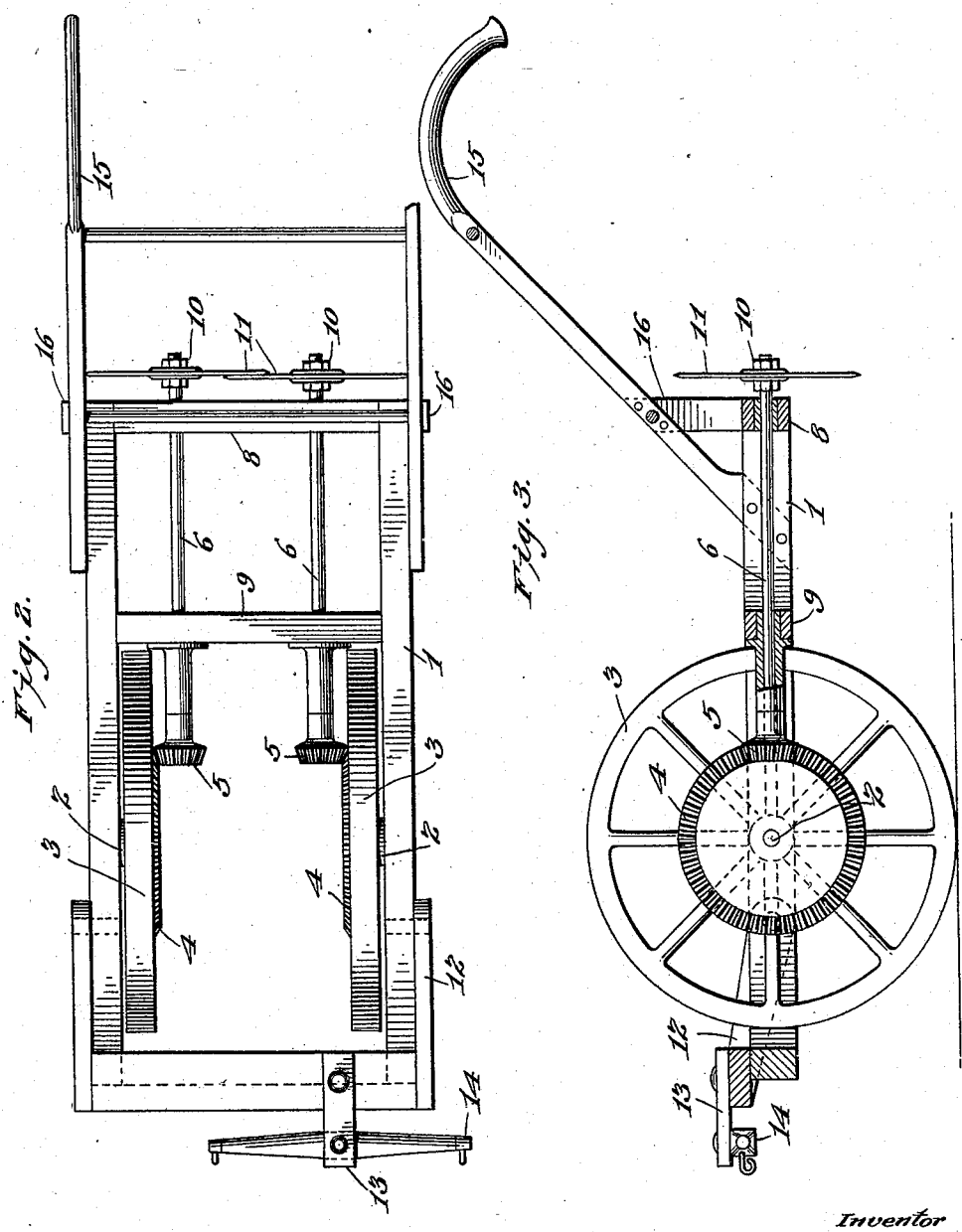

UNITED STATES PATENT OFFICE.

TAYLOR J. SMITH, OF BIRMINGHAM, ALABAMA.

COTTON-CHOPPER.

No. 924,287. Specification of Letters Patent. Patented June 8, 1909.

Application filed December 26, 1908. Serial No. 469,193.

*To all whom it may concern:*

Be it known that I, TAYLOR J. SMITH, a citizen of the United States, residing at Birmingham, in the county of Jefferson and State of Alabama, have invented certain new and useful Improvements in Cotton-Choppers, of which the following is a specification.

My invention relates to an improved cotton chopper, the object of the invention being to provide overlapping chopping disks with improved mechanism for revolving said disks, and providing an improved support for said disks, and driving mechanism which can be manually manipulated by the operator to raise and lower the disks at will.

A further object is to provide an improved frame pivotally supported in the hubs of the wheels, and supporting rotary disks, said disks being driven by the wheels, and the frame under the control of the operator, which will permit him to pivot the frame in the wheels to raise and lower the disks.

A further object is to provide an improved cotton chopper which will be extremely simple in construction, and which will perfectly chop the cotton, and which will be strong and durable in use.

With these and other objects in view, the invention consists in certain novel features of construction, and combinations, and arrangement of parts as will be more fully hereinafter described and pointed out in the claim.

In the accompanying drawings, Figure 1, is a perspective view illustrating my improvements. Fig. 2, is a top plan view, and Fig. 3, is a view in longitudinal section.

1 represents a rectangular frame having inwardly projecting axle stubs 2 secured to its sides at a point forward of the center of the frame, and said stubs are supported in the hubs of wheels 3 fulcruming the frame in the wheels for a purpose which will more fully hereinafter appear.

The wheels 3 are provided on their inner faces with toothed racks 4, meshing with pinions 5 secured upon parallel shafts 6, the latter supported in suitable bearings in the rear cross bar 8 of the frame, and in an intermediate cross bar 9 as clearly shown in Figs. 2 and 3. The rear ends of the shafts 6 are screw threaded to receive clamping nuts 10 securely clamping disks 11 on the shafts and compelling the disks to revolve with the shafts. These disks 11 overlap each other and are revolved in opposite directions so as to throw outwardly the cotton chopped, as the disks constitute, in effect, rotary mold boards.

A yoke frame 12 is pivotally secured at its ends to the side members of frame 1, at the forward end of the latter, and is provided with a forwardly projecting bar 13 to which latter a swingletree 14 is connected. This bar 13 is disposed to one side of the center of the yoke frame 12 so that the draft animal can walk in a line to one side of the cotton row.

15 represents handles which are secured to the side bars of frame 1, and to uprights 16 at the rear ends of said frame and are to be grasped by the operator, walking behind, to manipulate the chopper, as will now be explained.

As the frame is moved forward, the wheels 3 will turn, and through the medium of racks 4, and pinions 5, transmit motion to the shaft 6 and revolve disks 11, which latter engage the surface of the ground and chop out the cotton as the chopper moves along. The operator, who walks behind holding the handles 15, so as to properly position the disks 11, can, at regular intervals, elevate the handles to fulcrum the frame 1 on the hubs of the wheels 3, and thereby elevate the disks out of contact with the ground to leave a portion of the cotton, such as is ordinarily done. It will thus be observed that the operator has the chopper under complete control at all times, and can chop out any desired amount of cotton, and leave the hills of any size. The disks 11 shown in the drawings, are of flat type, but it is to be understood that I do not limit myself to any particular shape of disk, as I might employ any well known form, either straight or concavo-convex.

Various slight changes might be made in the general form and arrangement of parts described without departing from the spirit of my invention, and hence I do not restrict myself to the precise details set forth, but consider myself at liberty to make such changes and alterations as fairly fall within the spirit and scope of my invention.

Having thus described my invention what I claim as new and desire to secure by Letters Patent is:

In a device of the character described, the combination with wheels, of a rectangular frame, inwardly projecting axle stubs on said frame supported in the hubs of said wheels, longitudinal parallel shafts supported in said frame, racks on said wheels, pinions on said shafts meshing with said racks, whereby said shafts are driven in opposite directions, vertical transversely disposed chopping disks secured on the rear ends of said shafts and overlapping each other, and handles secured to said frame and extending rearwardly therefrom, whereby said frame and the chopping disks may be elevated at regular intervals to leave unchopped certain portions of the ground.

In testimony whereof I have signed my name to this specification in the presence of two subscribing witnesses.

TAYLOR J. SMITH.

Witnesses:
M. O. ALEXANDER,
J. A. FITCH.